Dec. 2, 1969 S. GUENNOU 3,482,058

AUTOMATIC NUMBER TRANSMITTING DEVICE

Filed Dec. 20, 1966 2 Sheets-Sheet 1

INVENTOR
SERGE GUENNOU
BY [signature]
AGENT

INVENTOR.
SERGE GUENNOU
BY
AGENT

United States Patent Office 3,482,058
Patented Dec. 2, 1969

3,482,058

AUTOMATIC NUMBER TRANSMITTING DEVICE

Serge Guennou, Vitry-sur-Seine, France, assignor, by mesne assignments, to U.S. Philips Corporation, New York, N.Y., a corporation of Delaware Filed Dec. 20, 1966, Ser. No. 603,383
Claims priority, application France, Dec. 22, 1965, 43,350
Int. Cl. H04m 3/60
U.S. Cl. 179—27 4 Claims

ABSTRACT OF THE DISCLOSURE

A storage and pulse transmission system for predetermined numbers incorporating a series of shift registers exceeding the digit number of the predetermined number by one, a pulse shifting network to advance the stored binary number through the registers, and a marking pulse gate responsive to marking pulses in the registers network to effect ultimate transmission of the stored number.

The invention relates to an automatic number transmitting device for use in telephone systems for transmitting pulse sequences, the numbers of pulses of which are characteristic of the digits of the selected number.

Such number transmitting devices are employed inter alia in telephone operator stations.

The invention has for its object to provide a number transmitting device comprising a minimum of electromechanical expedients.

The number transmitting device according to the invention is characterized in that it comprises a series of cascade-connected shift registers. The series commences with a shift register of the ordinal number 1 and finishes with a shift register of the ordinal number *n*. Each shift register comprises a series of binary storing places, the number of which exceeds the number of digit values by 1, the series commencing by a marking place of the ordinal number 1 and terminating by a storing place of the ordinal number *m*. A writing device distributes the selected digits among the shift registers, writing them in the shift registers by writing a binary mark in the marking place and in a storing place associated with the digit value. A shifting device for shifting the written marks towards the marking place of the shift register of the ordinal number 1 is provided, along with a pulse gate controlled from said marking place by the marks, said gate being connected between a pulse generator and an output of the transmitter.

Figure 1:
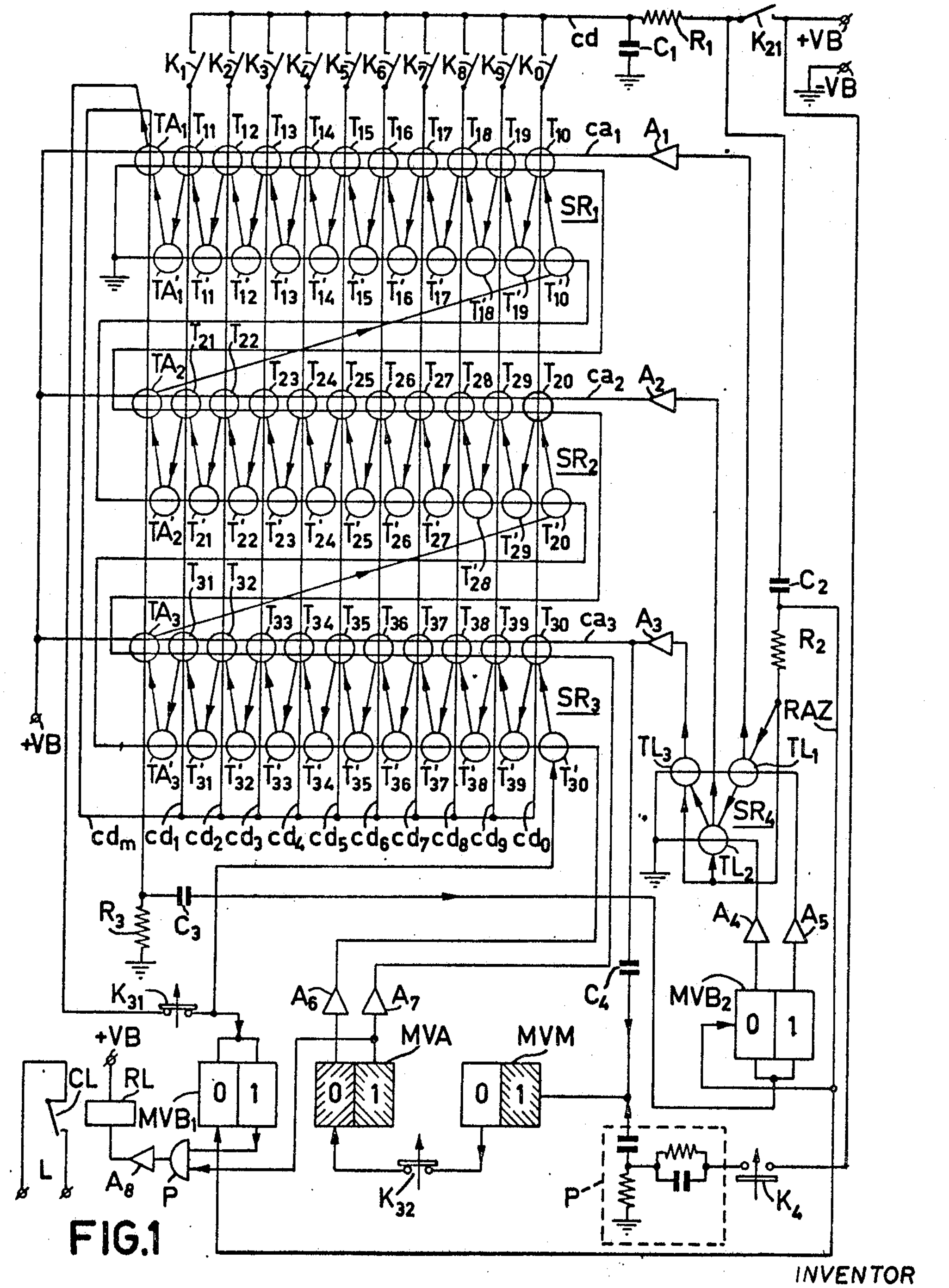
Figure 2:
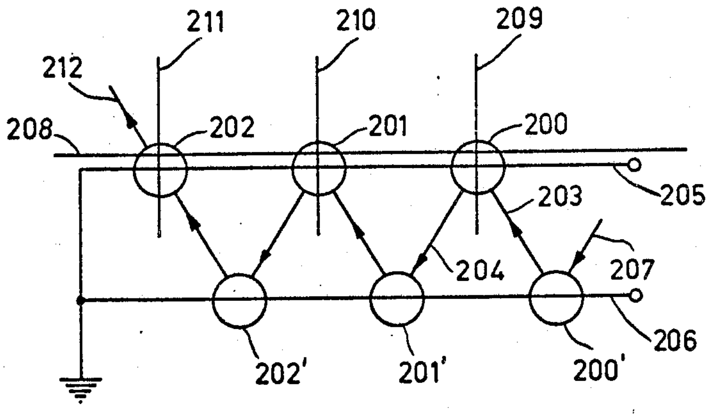

The invention will be described more fully with reference to the figures, of which FIGURE 1 shows one embodiment of a number transmitting device according to the invention and FIG. 2 illustrates symbolically a shift register.

FIG. 2 shows symbolically a known shift register comprising magnetic cores. This shift register comprises two branches. One branch includes the magnetic cores 200, 201, 202 and the other the magnetic cores 200′, 201′, 202′. The first branch is termed the upper branch and the last-mentioned branch is termed the lower branch. The core 200′ is coupled through a unilateral coupling circuit 203 with the core 200, which is coupled through a unilateral coupling circuit 204 with the core 201′, and so on. The cores of the upper branch are coupled with the shifting line 205 and the cores of the lower branch are coupled with the shifting line 206. In operation, shifting pulses are applied alternately to the shifting lines 205 and 206. The magnetic cores are of a magnetic material having a rectangular hysteresis loop. Each shifting pulse has sufficient strength for setting the magnetisation of a core, independently of the initial state, into a predetermined, stable state of remanence. The latter state is termed the state "0." The other stable state of remanence is termed the state "1." At the core 200′ reference numeral 207 designates an incoming coupling circuit. If, for example, the core 200′ is set into the state "0" through the incoming coupling circuit 207 or in another way, and if a shifting pulse arrives through the shifting line 206, the core 200′ is switched over from the state "1" into the state "0." The core 200′ then supplies a pulse through the unilateral coupling circuit 203 to the core 200. In this direction said pulse has a strength such that the core 200 is set into the state "1." The shifting pulse thus provides the transfer of the state "1" from the core 200′ to the core 200. When through the shifting line 205 a shifting pulse arrives, the core 200 is changed over from the state "1" to the state "0," whilst the core 201′ is set through the coupling circuit 204 into the state "1," and so on. At the core 202, reference numeral 212 designates an outgoing coupling circuit. Through this circuit a pulse is transferred, when the core changes over from the state "1" to the state "0."

The cores 200, 201, 202 are each coupled with an individual column conductor 209, 210, 211 and a common row conductor 208. In operation current pulses, termed half write pulses are selectively supplied to the row and column conductors. The half write pulses have the direction required for changing over a core from the state "0" to the state "1." The strength of these pulses is proportioned so that one half write pulse does not change the magnetisation of a core but that two half write pulses together can change over a core from the state "0" to the state "1." If, for example, a half write pulse is applied to the column conductor 209 and at the same time a half write pulse to the row conductor 208, the core 200 changes over to the state "1," whereas the magnetisation of the cores 201 and 202 does not change.

The automatic number transmitter shown in FIG. 1 comprises three shift registers $SR_1$, $SR_2$, $SR_3$ for the automatic emission of numbers of three digits. The shifting lines of the upper branches of the shift registers are connected in series with each other and to an amplifier $A_7$. Likewise the shifting lines of the lower branches are connected in series with each other and to an amplifier $A_6$. The upper branch and the lower branch of each shift register include each eleven cores. Ten of the cores of the upper branch of each shift register are individually joined to the digits 1, 2 . . ., 9, 0. The eleventh core has a particular function and is termed the marking core. The cores joined to the same digit are coupled with the same column conductor. For example, the cores $T_{11}$, $T_{21}$, $T_{31}$, joined to the digit 1, are coupled with the column conductor $cd_1$ and so on. In total there are ten column conductors $cd_1$ to $cd_0$. These column conductors are connected at one end to a common return conductor *cdm*, which is coupled with the marking cores $TA_1$, $TA_2$, $TA_3$ and which is connected to earth via a resistor $R_3$. To the column conductors $cd_1$ to $cd_0$ are joined individually the push-button switches $K_1$ to $K_0$. These switches are each connected between the conductor *cd* and the upper end of the associated column conductor. Between the conductor *cd* and earth there is connected a capacitor $C_1$ and between the conductor *cd* and the positive terminal +VB of a battery, the negative terminal of which −VB is connected to earth, there is connected a resistor $R_1$ in series with a hook switch $K_{21}$. When the receiver is lifted, the switch $K_{21}$ is closed and the capacitor $C_1$ is charged through the resistor $R_1$ by the battery. When a push-button switch is closed, a discharge current pulse passes through the conductor *cd*, the relevant column conductor, the common return conductor *cdm* and the resistor $R_3$ to earth. This discharge current pulse is proportioned like a half write pulse. To the registers $SR_1$, $SR_2$, $SR_3$ are individually joined the row conductors $ca_1$, $ca_2$, $ca_3$. Each row conductor is coupled with the cores of the upper branch of the associated register. For example, the row conductor $ca_1$ is coupled with the cores $TA_1$, $T_{11}$ . . .$T_{10}$. The row conductors are included in the output circuits of the amplifiers $A_1$, $A_2$, $A_3$. These amplifiers are controlled by a short shift register $SR_4$. This shift register comprises in its upper branch the cores $TL_1$ and $TL_2$ and in the lower branch the core $TL_3$. The shifting line of the upper branch is connected to an amplifier $A_5$ and the shifting line of the lower branch is connected to an amplifier $A_4$. The cores of the register $SR_4$ are individually joined to the amplifiers $A_1$ to $A_3$ and the four outgoing coupling circuits are connected to the input of the relevant amplifier. When a core changes over from the state "1" to the state "0," a pulse is transmitted through the coupling circuit to the associated amplifier, which then passes a half write pulse through the row conductor.

The amplifiers $A_4$ and $A_5$ are controlled by the inverse outputs of the divide-by-two circuit $MVB_2$. This control is such that, when the divide-by-two circuit changes over to the state "1," the amplifier $A_5$ supplies a shifting pulse and when the said circuit changes over to the state "0," the amplifier $A_4$ supplies a shifting pulse.

The core $Ta_3$ of the upper branch of the shift register $SR_3$ is coupled through a coupling circuit with the core $T'_{20}$ of the lower branch of the shift register $SR_2$. The core $TA_2$ of the upper branch of shift register $SR_2$ is coupled through a coupling circuit with the core $T'_{10}$ of the lower branch of shift register $SR_1$. The core $TA_1$ of the upper branch of shift register $SR_1$ is coupled through a coupling circuit with the core $T'_{30}$ of the lower branch of shift register $SR_3$. In this way the shift registers $SR_1$, $SR_2$, $SR_3$ form a single, great, shift-register loop comprising 33 cores in the upper branch and 33 cores in the lower branch.

The amplifiers $A_6$ and $A_7$ are controlled by the inverse outputs of a mutivibrator MVA. When the multivibrator is released, it starts oscillating between the states "0" and "1." The amplifiers $A_6$ and $A_7$ are controlled so that, when the multivibrator changes over to the state "1," the amplifier $A_7$ provides a shifting pulse and, when the multivibrator changes over to the state "0," the amplifier $A_6$ supplies a writing pulse. The output signal controlling the amplifier $A_7$ is applied through an amplifier $A_8$ to the winding of a relay RL, a break-contact CL of which is included in the telephone line L. Between the multivibrator MVA and the amplifier $A_8$ there is connected a gate P, which is controlled by a divided-by-two circuit $MVB_1$. The gate P is controlled so that it is cut off, when the divide-by-two circuit $MVB_1$ is in the state "0," whereas the gate is conducting, when the divided-by-two circuit is in the state "1." When the gate is conducting, the multivibrator MVA controls the relay RL so that when the multivibrator is in the state "1," the relay is energized and, when it is in the state "0," the relay is released. In this example it is assumed that the multivibrator has a period of 100 msec. and that it is in the state "1" for 60 msec. during each period and correspondingly in the state "0" for 40 msec. The times of opening and closing of the break-contact CL are then about 60 msec. and 40 msec. respectively.

When the multivibrator MVA is released, the amplifiers $A_7$ and $A_6$ supply a shifting pulse every 100 msec., the shift pulse of the amplifier $A_6$ having a time lag of 60 msec. with respect to the shifting pulse of the amplifier $A_7$. If one of the cores of the shift register loop is in the state "1," 33 periods of the multivibrator, i.e. 3300 msec. are required for shifting the state "1" of said core through the register to the core itself. This period of 3300 msec., termed the back write period is timed by a monostable flipflop MVM. This flipflop controls the multivibrator MVA so that, when the flipflop is in the state "0," the multivibrator is held in the state "1" and, when the flipflop is in the state "1," the multivibrator is released. The flipflop is normally in the state "0" and can be changed over to the state "1" by a pulse, the flipflop returning automatically to the state "0" after a given delay time. This delay time may be 3280 msec. After the release the multivibrator immediately changes over to the state "1." The instant shifted relatively thereto by 3280 msec. coincides with the centre of the last portion of the 33rd period. At this instant the multivibrator is in the state "0" and is held in this state by the monostable flipflop MVM.

The number transmitting device furthermore operates as follows. When the receiver is lifted, the hook switch $K_{21}$ is closed and the capacitor $C_1$ is charged through the resistor $R_1$. Through the series combination of capacitor $C_2$ and resistor $R_2$ a pulse is transmitted to the shift register $SR_4$ and via the capacitor $C_2$ and the line RAZ a pulse is transmitted to the divide-by-two circuits $MVB_1$ and $MVB_2$. The pulse applied to the shift register $SR_4$ is transferred through an incoming coupling circuit to the cores $TL_1$, $TL_2$, $TL_3$, so that the core $TL_1$ is changed over to the state "1" and the cores $TL_2$ and $TL_3$ to the state "0." The pulse applied to the divide-by-two circuits $MVB_1$ and $MVB_2$ changes over these circuits to the state "0."

It will be supposed that the number 475 has to be chosen. In the first place the push-button switch $K_4$ is closed, so that a half write pulse is passed through the column conductor $cd_4$ and the common return conductor $cdm$. The leading edge of said pulse produces through the capacitor $C_3$ a pulse at the output of the divide-by-two circuit $MVB_2$, which thus changes over to the state "1." As a result, the amplifier $A_5$ passes a shifting pulse through the shifting line of the upper branch of the shift register $SR_4$, so that the state "1" of the core $TL_1$ is passed through the core $TL_2$ and the amplifier $A_1$ passes a half write pulse through the row conductor $ca_1$. The cores $TA_1$ and $T_{14}$ of the upper branch of the shift register $SR_1$ then receive both through their column conductor and their row conductor a half write pulse, so that only these cores are shifted to the state "1." Then the push-button switch $K_7$ is closed. As a result, a half write pulse is passed through the column conductors $cd_7$ and $cdm$ and through the capacitor $C_3$ a pulse is applied to the divide-by-two circuit $MVB_2$, which is thus passed to the state "0." Owing to the change-over of the divide-by-two circuit $MVB_2$, the amplifier $A_4$ passes a shifting pulse through the write line of the lower branch of the shift register $SR_4$, so that the state "1" of the core $TL_2$ is passed to the core $TL_3$ and the amplifier $A_2$ passes a half write pulse through the row conductor $ca_2$. As a result, the cores $TA_2$ and $T_{27}$ of the upper branch of shift register $SR_2$ change over to the state "1." Finally the push-button switch $K_5$ is closed. As a result, the cores $TA_2$ and $T_{35}$ of the upper branch of the shift register $SR_3$ change over to the state "1." The half write pulse applied to the row conductor $ca_3$ produces through the capacitor $C_4$ a pulse at the input of the monostable flipflop MVM, which thus changes over to the state "1." The multivibrator MVA is thus released for 33 periods.

The coupling circuit between the marking core $TA_1$ and the core $T'_{30}$ is connected to the input of the divide-by-two circuit $MVB_1$. When a pulse is transferred from the marking core $TA_1$ to the core $T'_{30}$, this pulse also arrives at the input of the divide-by-two circuit $MVB_1$. Such a pulse causes the circuit to change over. The first shifting pulse supplied by the amplifier $A_7$ after the release of the multivibrator shifts on the state "1" of the marking core $TA_1$ to the core $T'_{30}$, so that the divide-by-two circuit $MVB_1$ changes over to the state "1." As a result the gate P becomes conducting. The state "1" of the core $T_{14}$ is shifted within four periods of the multivibrator to the core $TA_1$. The shifting pulse supplied by the amplifier $A_7$ at the beginning of the fifth period shifts the state "1" of the core $TA_1$ to the core $T'_{30}$, so that the divide-by-two circuit $MVB_1$ returns to the state "0" and the gate P is cut off. The gate P has then been open for four complete periods of the multivibrator. As a result the break contact CL transmits a sequence of four pulses (contact openings) characteristic of the digit 4 through the telephone line. The state "1" of the marking core $TA_2$ reaches the core $TA_1$ after 11 shift periods and the state "1" of core $T_{27}$ reaches the core $TA_1$ after 18 shift periods. The gate P is then conducting from the beginning of the 12th shift period up to the end of the 18th shift period, that is to say for 7 complete shift periods. Therefore, the break contact transmits a sequence of 7 pulses. The state "1" of the marking core $TA_3$ reaches the core $TA_1$ after 22 shift periods and the state "1" of the core $T_{35}$ reaches the core $TA_1$ after 27 shift periods. The gate P is then conducting from the beginning of the 23rd shift period up to the end of the 27th shift period, that is to say for 5 complete shift periods. As a result, the break contact CL transmits a sequence of 5 pulses. After 33 shift periods the number 475 is back at the initial place.

For the retransmission of the number 475 it is only necessary to actuate the push-button switch $K_4$. This switch connects the RC network P to the positive terminal +VB of the battery, so that a pulse appears at the output of the network P. This pulse changes over the monostable flipflop MVM to the state "1" so that the multivibrator MVA is released again for 33 periods.

In order to erase a number the switches $K_{31}$ and $K_{32}$ are actuated. The switch $K_{31}$ interrupts the coupling circuit between the marking core $TA_1$ on the one hand and the core $T'_{30}$ and the input of the divide-by-two circuit $MVB_1$ on the other hand. The switch $K_{32}$ interrupts the control line between the monostable flipflop MVM and the multivibrator, the latter being thus released. The switches are kept in the closed state until the number is completely shifted out of the shift register. The time of closing is at least 33,000 msec. This time may be reduced by changing over at the same time the time constant of the multivibrator to a lower value, so that the duration of the period is shortened.

The push-button switch $K_4$ may also be employed for starting the transmission of a number after a one- or two-digit number is selected. In these cases the flipflop MVM does not automatically receive a pulse. This pulse is applied only after the third digit has been chosen.

What is claimed is:

1. An automatic number transmitting device for use in telephone systems for transmitting pulse sequences, the number of pulses of which are characteristic of the digits of the selected number, said device comprising a series of cascade-connected shift registers, said series starting by a shift register of the ordinal number 1 and terminating by a shift register of the ordinal number *n*, each shift register comprising a series of binary storing places, the number of which exceeds the number of digit values by 1, said series starting by a marking place of the ordinal number 1 and terminating by a storing place of the ordinal number *m*, a write device for distributing the selected digits among the shift registers and for writing them in the shift registers by writing a binary mark at the marking place and at a storing place associated with the digit value, a shift device for shifting the written marks towards the marking place of the shift register of the ordinal number 1 and a pulse gate controlled by the marks from said marking place and connected between a pulse generator and an output of the transmitter.

2. An automatic number transmitting device as claimed in claim 1, wherein a coupling circuit is provided between the marking place of the shift register of the ordinal number 1 and the storing place of the ordinal number *m* of the shift register of the ordinal number *n*.

3. An automatic number transmitting device as claimed in claim 1, wherein the shift registers have, at each storing place, a magnetic core of rectangular hysteresis loop, while of the group of *p* magnetic cores where *p* is the product of m times *n*, only either of two of which is associated with the same storing place of the same shift register, each group of *m* cores associated with the same shift register is coupled with a row conductor individually joined to the shift register and each group of *n* cores associated with a storing place of the same ordinal number exceeding 1 is coupled with the relevant column conductor, a column selecting device for selecting a column conductor and a row selecting device for selecting a row conductor, and a source of pulses for supplying half write pulses in coincidence to the selected column and row conductors.

4. An automatic number transmitting device as claimed in claim 3, wherein the column conductors are connected to a common return conductor and in that of the last mentioned group of *p* cores the group of *n* cores associated with a storing place of the ordinal number 1 is coupled with the common return conductor.

References Cited

UNITED STATES PATENTS 2,835,741 5/1958 Vaughan.

KATHLEEN H. CLAFFY, Primary Examiner

T. W. BROWN, Assistant Examiner

U.S. Cl. X.R.

179—18, 90